US008095691B2

(12) United States Patent
Verdoorn, Jr. et al.

(10) Patent No.: US 8,095,691 B2
(45) Date of Patent: Jan. 10, 2012

(54) MULTI-NODE CONFIGURATION OF PROCESSOR CARDS CONNECTED VIA PROCESSOR FABRICS

(75) Inventors: William Garrett Verdoorn, Jr., Rochester, MN (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/830,275

(22) Filed: Jul. 2, 2010

(65) Prior Publication Data

US 2010/0268986 A1    Oct. 21, 2010

Related U.S. Application Data

(62) Division of application No. 11/763,411, filed on Jun. 14, 2007, now Pat. No. 7,783,813.

(51) Int. Cl.
G06F 11/07    (2006.01)
(52) U.S. Cl. .............................................. 710/1; 714/10
(58) Field of Classification Search .................. None
See application file for complete search history.

(56) References Cited

U.S. PATENT DOCUMENTS

| | | | |
|---|---|---|---|
| 5,381,541 A | 1/1995 | Begun et al. | |
| 5,594,918 A | 1/1997 | Knowles et al. | |
| 5,802,355 A | 9/1998 | Arroyo et al. | |
| 5,909,571 A | 6/1999 | Polzin et al. | |
| 6,025,989 A | 2/2000 | Ayd et al. | |
| 6,078,990 A | 6/2000 | Frazier | |
| 6,351,819 B1 * | 2/2002 | Berglund et al. | 713/310 |
| 6,640,272 B1 | 10/2003 | Hartwell et al. | |
| 6,687,818 B1 | 2/2004 | Svenkeson et al. | |
| 6,715,018 B2 | 3/2004 | Farnworth et al. | |
| 6,725,307 B1 | 4/2004 | Alvarez, II et al. | |
| 6,757,790 B2 | 6/2004 | Chalmer et al. | |
| 6,769,069 B1 | 7/2004 | Nguyen | |
| 6,816,590 B2 | 11/2004 | Pike et al. | |
| 6,826,456 B1 | 11/2004 | Irving et al. | |
| 6,851,324 B2 | 2/2005 | Islam et al. | |
| 6,918,051 B2 * | 7/2005 | Block et al. | 714/4 |
| 6,922,791 B2 * | 7/2005 | Mashayekhi et al. | 714/4.11 |
| 6,944,785 B2 * | 9/2005 | Gadir et al. | 714/4.11 |
| 6,990,478 B2 | 1/2006 | Loy et al. | |
| 7,003,645 B2 | 2/2006 | Knop et al. | |
| 7,058,858 B2 * | 6/2006 | Wong et al. | 714/42 |

(Continued)

OTHER PUBLICATIONS

R. Kumar et al., "Interconnections in Multi-Core Architectures: Understanding Mechanisms, Overheads and Scaling", IEEE, 2005, pp. 1-12.

(Continued)

*Primary Examiner* — Cheng-Yuan Tseng
(74) *Attorney, Agent, or Firm* — David W. Victor; Konrad Raynes and Victor LLP

(57) ABSTRACT

Provided is a system comprising a first node comprising a plurality of processor cards each including a processor fabric, wherein the processor cards in the first node connect via their processor fabrics; a second node comprising a plurality of processor cards each including a processor fabric, wherein the processor cards in the second node connect via their processor fabrics; and a plurality of communication interfaces, wherein each interface connects one processor card in the second node to one processor card in the first node to enable communication between the connected processor cards to coordinate processor operations between the connected processor cards in the first and second nodes.

4 Claims, 5 Drawing Sheets

U.S. PATENT DOCUMENTS

| | | | |
|---|---|---|---|
| 7,062,676 B2 * | 6/2006 | Shinohara et al. | 714/15 |
| 7,065,599 B2 * | 6/2006 | King et al. | 710/301 |
| 7,085,897 B2 | 8/2006 | Blake et al. | |
| 7,117,213 B2 * | 10/2006 | McDermott et al. | 1/1 |
| 7,162,545 B2 * | 1/2007 | Sudo | 709/201 |
| 7,234,075 B2 * | 6/2007 | Sankaran et al. | 714/13 |
| 7,240,154 B2 | 7/2007 | Frangioso et al. | |
| 7,281,154 B2 * | 10/2007 | Mashayekhi et al. | 714/4.11 |
| 7,283,374 B2 | 10/2007 | Pedoeem et al. | |
| 7,321,948 B1 | 1/2008 | Sullivan et al. | |
| 7,379,418 B2 | 5/2008 | Korb et al. | |
| 7,398,293 B2 | 7/2008 | Ramsey et al. | |
| 7,415,553 B2 * | 8/2008 | Nguyen | 710/100 |
| 7,451,347 B2 * | 11/2008 | Subbaraman et al. | 714/10 |
| 7,478,263 B1 * | 1/2009 | Kownacki et al. | 714/4.11 |
| 7,512,836 B2 | 3/2009 | Darrington et al. | |
| 7,543,174 B1 * | 6/2009 | van Rietschote et al. | 714/4 |
| 7,689,862 B1 * | 3/2010 | Bharthulwar et al. | 714/13 |
| 7,757,116 B2 * | 7/2010 | Brown et al. | 714/13 |
| 7,774,785 B2 * | 8/2010 | Hartung et al. | 718/104 |
| 7,783,813 B2 | 8/2010 | Verdoorn, Jr. et al. | |
| 2002/0124128 A1 | 9/2002 | Qiu | |
| 2003/0101426 A1 * | 5/2003 | Sarkinen et al. | 716/12 |
| 2004/0199699 A1 * | 10/2004 | Bobbitt et al. | 710/305 |
| 2005/0108593 A1 * | 5/2005 | Purushothaman et al. | 714/4 |
| 2005/0283658 A1 * | 12/2005 | Clark et al. | 714/11 |
| 2006/0179364 A1 | 8/2006 | Swaney et al. | |
| 2007/0214299 A1 * | 9/2007 | Lo | 710/301 |
| 2008/0080146 A1 | 4/2008 | King et al. | |

OTHER PUBLICATIONS

H.M. Mathis et al., "IBM System p5 575 8-core 2.2 GHz, 16-core 1.9 GHz Ultra-dense, Modular Cluster Nodes for High Performance Computing", IBM Corp., Feb. 2006, pp. 1-14.

G. Anselmi et al., "IBM System p5 570 Technical Overview and Introduction", IBM Corp. Sep. 2006, pp. 1-96.

First Office action for U.S. Appl. No. 11/763,411, dated Aug. 5, 2009, 20 pgs.

Response to First Office action for U.S. Appl. No. 11/763,411, dated Nov. 5, 2009, 14 pgs.

Final Office action for U.S. Appl. No. 11/763,411, dated Dec. 31, 2009, 13 pgs.

Response to Final Office action for U.S. Appl. No. 11/763,411, dated Mar. 31, 2010, 9 pgs.

Notice of Allowance for U.S. Appl. No. 11/763,411, dated Apr. 14, 2010, 10 pgs.

Chinese Office Action for Application No. CN200811255950 20080613, dated Jul. 19, 2011, 5 pgs.

\* cited by examiner

MULTI-NODE CONFIGURATION OF PROCESSOR CARDS CONNECTED VIA PROCESSOR FABRICS

This application is a divisional of U.S. patent application Ser. No. 11/763,411, filed on Jun. 14, 2007, now U.S. Pat. No. 7,783,813 which patent application is incorporated herein by reference in its entirety.

BACKGROUND OF THE INVENTION

1. Field of the Invention

The present invention relates to a method, system, and article of manufacture for a multi-node configuration of processor cards connected via processor fabrics.

2. Description of the Related Art

Host systems in a storage network may communicate with a storage controller through multiple paths. The storage controller may be comprised of separate storage clusters, where each storage cluster is capable of accessing the storage and provide redundancy to access the storage. If a storage cluster fails, then the host may failover to using the other storage cluster to access the storage.

In certain systems, multiple dual clustered storage servers may manage I/O access to one storage system. During operations, each storage server is assigned a different range of the storage, such as different Logical Unit Numbers (LUNs). If a request is received at one storage server or storage cluster, then the storage server or cluster would process the request if the target LUN was assigned to the receiving storage server. The storage server would forward the I/O request to another storage server or cluster that manages access to the target LUN. This arrangement requires that every storage server/cluster has knowledge of the LUNs managed by every other storage server/cluster. If one storage server fails, then the nodes managed by that storage server are assigned to a surviving storage server as part of a failover operation. If a storage server recovers, then a failback may occur to reassign the recovered storage server some of the LUNs.

Storage servers may package electronics to accommodate multiple processor cards, including bus interfaces and other electronic components to support the multiple processor cards implementing different nodes in the system. Such an architecture requires that the server include multiple redundant components, e.g., slots, bus interfaces, etc. In many environments, all of the server electronics, such as slots, bus interfaces, etc., may not be used if the maximum number of allowable processor cards are not included or required in the environment in which the storage server is deployed.

There is a need in the art for improved techniques for configuring multiple nodes in a storage system.

SUMMARY

Provided is a system comprising a first node comprising a plurality of processor cards each including a processor fabric, wherein the processor cards in the first node connect via their processor fabrics; a second node comprising a plurality of processor cards each including a processor fabric, wherein the processor cards in the second node connect via their processor fabrics; and a plurality of communication interfaces, wherein each interface connects one processor card in the second node to one processor card in the first node to enable communication between the connected processor cards to coordinate processor operations between the connected processor cards in the first and second nodes.

In a further embodiment, the communication interfaces and processor fabrics utilize different technologies, wherein the processor cards in each of the first and second nodes that communicate over the first and second processor fabrics function as first and second symmetrical multi-processors.

In a further embodiment, the processor cards in different nodes do not communicate with each other using the processor fabric technology.

In a further embodiment, there are a plurality of midplanes, wherein each midplane includes at least two processor cards and wherein each of the first and second nodes includes at least one processor card from each midplane. Each processor card includes a processor fabric interface to connect to other processor cards in the first or second node including the processor card.

In a further embodiment, each midplane is included within a storage server.

In a further embodiment, each midplane includes an Input/Output (I/O) adaptor enabling communication with an external device, wherein each processor card in each midplane is connected to the I/O adaptor on the midplane using a communication interface different from the processor fabric interface.

In a further embodiment, cables connect processor cards in the first node and connect processor cards in the second node.

xx In a further embodiment, node management code executed by at least one processor card in each of the first and second nodes to perform operations, the operations comprising: detecting a failure of one processor card in one of the first or second node; determining whether the node including the failed processor card includes at least one operational processor card; reconfiguring the first or second node including the failed processor to operate without the failed processor in response to the determining that the node includes at least one operational processor card; and performing a failover to use the first or second node not including the failed processor card in response to the determining that the node does not include at least one operational processor card.

In a further embodiment, node management code executed by at least one processor card in each of the first and second nodes to perform operations, the operations comprising: detecting a failure of one processor card in one of the first or second node; performing a failover to use the first or second node that does not include the failed processor card.

In a further embodiment, a system includes a first midplane including a first and second processor cards, wherein each processor card includes a processor fabric and a first communication interface connecting the first and second processor cards to enable communication between the first and second processor cards. A second midplane includes a third and fourth processor cards, wherein each processor card includes a processor fabric, wherein the first and third processor cards connect via their processor fabrics and wherein the second and fourth processor cards connect via their processor fabrics. A second communication interface connects the third and fourth processor cards to enable communication between the third and fourth processor cards.

Further provide are a method and article of manufacture for configuring a first node comprising a plurality of processor cards, each having a processor fabric, connected via their processor fabrics; configuring a second node comprising a plurality of processor cards, each having a processor fabric, connected via their processor fabrics; and configuring a plurality of communication interfaces, wherein each interface connects one processor card in the second node to one processor card in the first node to enable communication between the connected processor cards to coordinate processor operations between the connected processor cards in the first and second nodes.

In a further embodiment, the communication interfaces and processor fabrics utilize different technologies, wherein configuring the first and second nodes and the processor fabrics comprises configuring the first and second nodes to function as a first and second symmetrical multi-processors, respectively.

In a further embodiment, configuring the first and second nodes and processor fabrics further comprises configuring a plurality of midplanes, wherein each midplane includes at least two processor cards, and wherein each of the first and second nodes includes at least one processor card from each midplane.

In a further embodiment, a failure is detected of one processor card in one of the first or second node. A determination is made as to whether the node including the failed processor card includes at least one operational processor card. The first or second node including the failed processor is reconfigured to operate without the failed processor in response to the determining that the node includes at least one operational processor card. A failover is performed to use the first or second node not including the failed processor card in response to the determining that the node does not include at least one operational processor card.

In a further embodiment, a failure is detected of one processor card in one of the first or second node. A failover is performed to use the first or second node that does not include the failed processor card.

DETAILED DESCRIPTION

Figure 1:
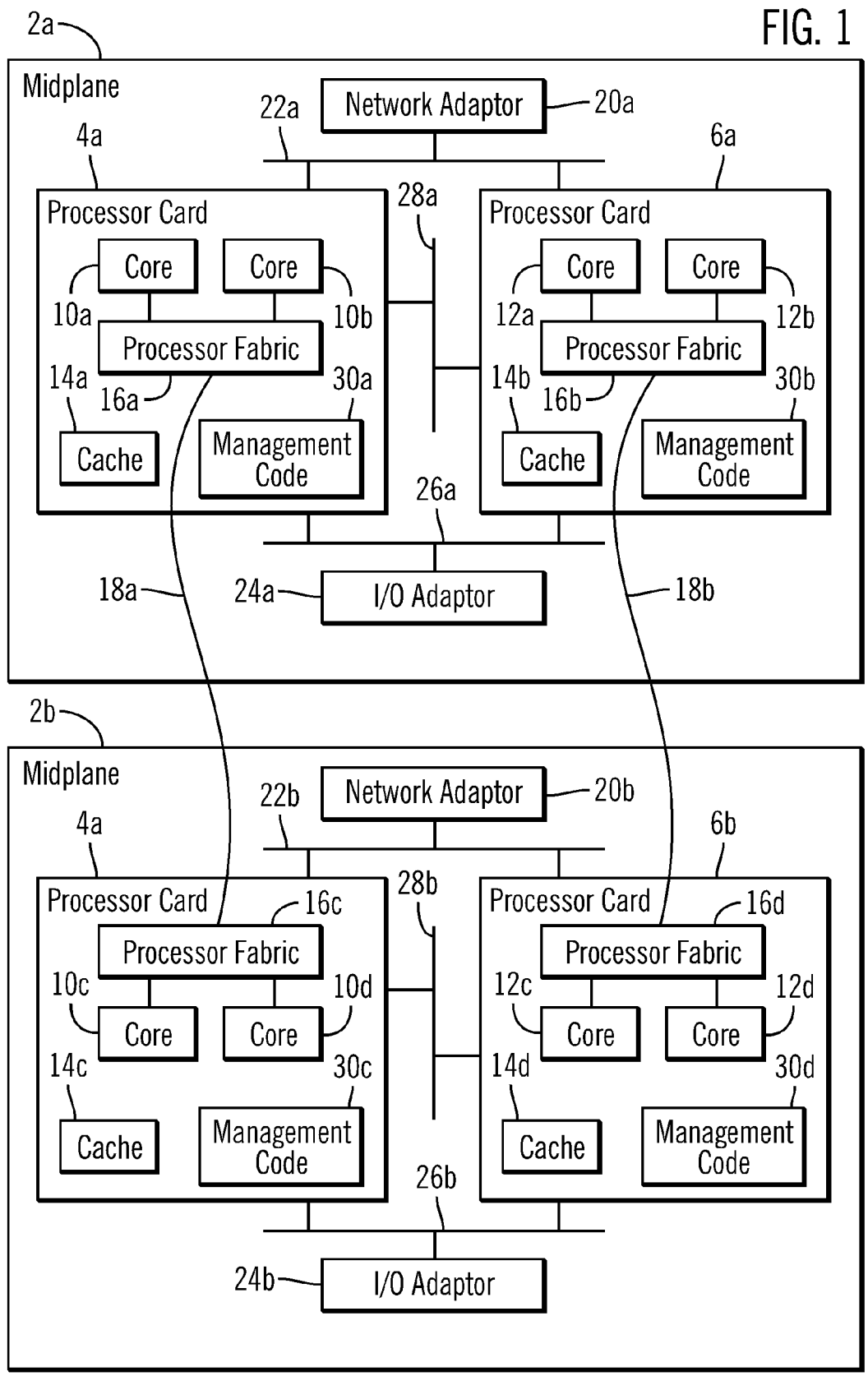
FIG. 1 illustrates an embodiment of a multi-node computing environment.

FIG. 1 illustrates an embodiment of a computing environment. Midplanes 2a, 2b each include two processor cards 4a, 6a and 4b, 6b, which may comprise expansion cards inserted in expansion slots of the midplanes 2a, 2b. Alternatively, the processor cards 4a, 4b, 6a, 6b may be implemented on the midplane 2a, 2b board. Each processor card 4a, 4b, 6a, 6b includes one or more cores 10a, 10b, 10c, 10d, 12a, 12b, 12c, 12d. Although two cores are shown on each processor card 4a, 4b, 6a, 6b, each processor card 4a, 4b, 6a, 6b may include one or more than two cores. Each processor card 4a, 6a, 4b, 6b further includes a cache 14a, 14b, 14c, 14d providing on-board storage for their processor card 4a, 6a, 4b, 6b. Processor fabrics 16a, 16b, 16c, 16d in processor cards 4a, 4b, 6a, 6b, respectively, provide busses, ports, logic, arbiter, queues, etc. to enable communication among cores 10a, 10b, 10c, 10d, 12a, 12b, 12c, 12d on the same processor card and cores on different processor cards 4a, 4b, 6a, 6b. The processor fabrics 16a, 16b, 16c, 16d further include fabric controls (not shown) that mediate the contention for the fabric bus by the various attached cores 10a, 10b, 12a, 12b, 10c, 10d, 12c, 12d and provide for Symmetrical Multiprocessor (SMP) topology configuration via the fabric ports of all processor cards 4a, 4b, 6a, 6b whose processor fabrics 16a, 16b, 16c, 16d are connected. Cables 18a, 18b, such as flex cables, are used to connect processor fabrics 16a and 16c and processor fabrics 16b and 16d. The cables 18a and 18b may connect directly to the processor cards 4a, 4b, 6a, 6b.

All the cores 10a, 10b, 10c, 10d, 12a, 12b, 12c, 12d on the same and different processor cards 4a, 4b, 6a, 6b connected to interconnecting processor fabrics 16a, 16b, 16c, 16d function as a single SMP. For instance, cores 10a, 10b, 10c, and 10d connected to interconnecting processor fabrics 16a and 16c form a single SMP. The interconnected fabrics 16a and 16c provide a high-speed link to communicate data between the connected cores 10a, 10b, 10c, 10d and other components on the connected processor cards 4a, 4b, such as caches and memory, in a coherent fashion to support coherence transactions and arbitrate access to the interconnected fabrics 16a and 16b. Similarly, the cores 12a, 12b, 12c, and 12d connect to interconnecting processor fabrics 16b and 16d to form a single SMP. Thus, separate SMPs are formed by using a combination of processor cards from different midplanes 2a, 2b, where each midplane 2a, 2b provides one processor card 4a, 4b, 6a, 6b to each SMP.

Each midplane 2a, 2b further includes network adaptors 20a and 20b that connect to the processor cards 4a, 6a and 4b, 6b, respectively, to provide a connection to a network. Each midplane 2a, 2b provides a bus 22a, 22b comprising a communication interface between the network adaptors 20a and 20b and processor cards 4a, 6a and 4b, 6b, respectively. The busses 22a and 22d may utilize bus interface technologies known in the art, such as Peripheral Component Interconnect (PCI), PCI express, etc.

Each midplane 2a, 2b further includes Input/Output (I/O) adaptors 24a and 24b that connect to the processor cards 4a, 6a and 4b, 6b, respectively, to provide a connection to attached external devices, such as storage devices, printers or other I/O devices known in the art. Each midplane 2a, 2b provides a bus 26a, 26b comprising a bus communication interface between the I/O adaptors 24a, 24b and processor cards 4a, 6a and 4b, 6b, respectively. The busses 26a and 26b may utilize bus technologies known in the art, such as Peripheral Component Interconnect (PCI), PCI express, etc.

Clustering busses 28a and 28b provide a communication interface between processor cards 4a, 6a and 4b, 6b in the same midplane 2a, 2b, respectively, or provide a connection between the two different clusters. The clustering busses 28a and 28b may utilize bus technologies known in the art, such as Peripheral Component Interconnect (PCI), PCI express, etc. Cores 10a, 10b, 12a, 12b and 10c, 10d, 12c, 12d on processor cards 4a and 6a in the same midplane 2a and 2b, respectively, may communicate to coordinate a failover if one processor card fails to the surviving processor card and a failback to using a recovered processor card 4a or 6a.

In one embodiment, each processor card 4a, 6a, 4b, 6b includes management code 30a, 30b, 30c, 30d to manage the configuration of the processor cards 4a, 6a, 4b, 6b in nodes and to manage failback and failback operations as nodes. The management code 30a, 30b, 30c, 30d may comprise hardware and/or computer executable code executed by one or more of the cores 10a, 10b, 10c, 10d, 12a, 12b, 12c, 12d in the processor cards 4a, 6a, 4b, 6b. In an alternative embodiment, the management code may be executed by components external to the processor cards configured as nodes.

In one embodiment, the midplanes 2a and 2b may be included in separate storage servers or boxes. Further, although FIG. 1 shows two midplanes 2a and 2b, the symmetrical multiprocessor formed by interconnecting the processor fabrics on processor cards in different midplanes may be expanded by further interconnecting processor fabrics on processor cards in an additional midplane.

Figure 2:
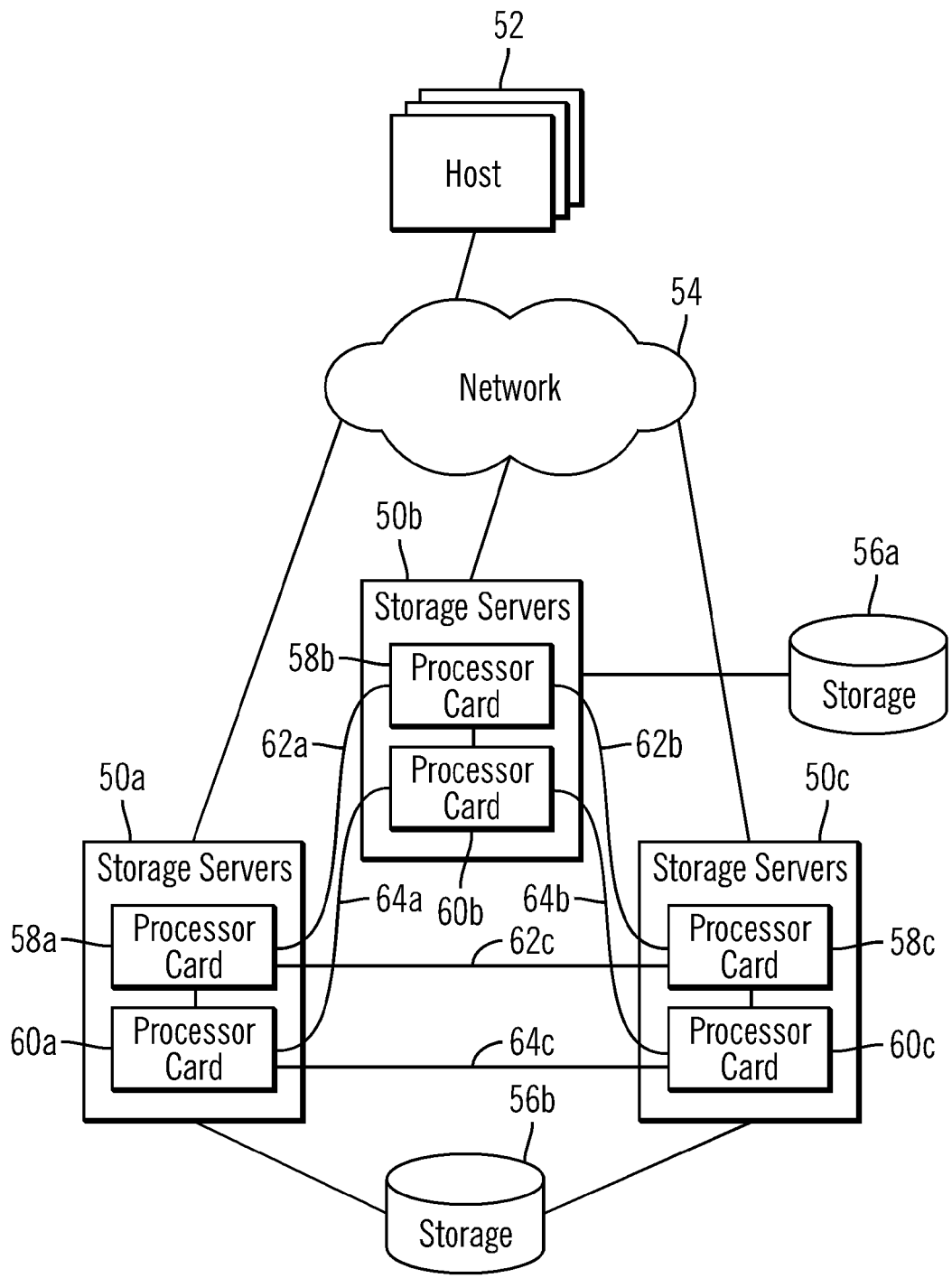
FIG. 2 illustrates an additional embodiment of a multi-node computing environment.

FIG. 2 illustrates a network computing environment including a plurality of storage servers 50a, 50b, 50c connected together in a manner to function as a single storage image. The storage servers 50a, 50b, 50c receive I/O requests from hosts 52 over a network 54 with respect to storage systems 56a and 56b. The storage systems 56a and 56b may be coupled to one or more of the storage servers 50ba, 50b, 50c. Each storage server 50a, 50b, 50c may implement the architecture of FIG. 1, where each server includes at least two processor cards 58a, 60a, 58b, 60b, and 58c, 60c. Each storage server 50a, 50b, 50c can have more than the shown two processor cards. Further, the processor fabrics of processor cards 58a, 58b, and 58c in the storage servers 50a, 50b, 50c are interconnected by cables 62a, 62b, 62c to form one symmetrical multi-processor or first node in a storage system comprising processor cards 58a, 58b, 58c from all three storage servers 50a, 50b, 50c. Further, the processor fabrics of processor cards 60a, 60b, and 60c in the storage servers 50a, 50b, 50c are interconnected by cables 64a, 64b, and 64c to form another symmetrical multi-processor or second node in a storage system comprising the processor cards 60a, 60b, 60c from all three storage servers 50a, 50b, 50c.

In one embodiment, each processor card includes a point-to-point processor fabric connection with every other processor card in the same node. In an alternative embodiment, not all processor cards in a same node, e.g., 58a, 58b, 58c or 60a, 60b, 60c, are directly connected and instead processor cards in a same node may communicate through one or more other processor cards in the same node connected to the same fabric.

In this way, multiple storage server 50a, 50b, 50c boxes are connected in a manner to provide two symmetrical multi-processors or nodes, where each node extends across the storage servers. A node thus comprises processor cards connected through processor fabric interfaces. During operations, load balancing may be performed among nodes to distribute host requests to processor cards in the same node and across nodes to balance the workload between the nodes. All adaptors 20a, 20b and 24a, 24b may be connected to both nodes in a system by connecting to one processor card 4a, 6a, 4b, 6b in each node in a midplane 2a, 2b.

The storage servers 50a, 50b, 50c may comprise storage controllers or storage servers known in the art, such as enterprise level storage servers or lower end server products. Midplanes 2a, 2b may be included in different storage server boxes or blades in a single storage server box. The hosts 52 may comprise computing devices known in the art, such as a server, mainframe, workstation, personal computer, hand held computer, laptop, telephony device, network appliance, etc., that are capable of communicating I/O requests to the storage servers 50a, 50b, 50c to access storages 56a, 56b. The network 54 may comprise a Storage Area Network (SAN), Local Area Network (LAN), Intranet, the Internet, Wide Area Network (WAN), peer-to-peer network, etc. The storages 56a, 56b may comprise a single storage device, e.g., disk drive, an array of storage devices, such as a Just a Bunch of Disks (JBOD), Direct Access Storage Device (DASD), Redundant Array of Independent Disks (RAID) array, virtualization device, tape storage, flash memory, etc.

Figure 3:
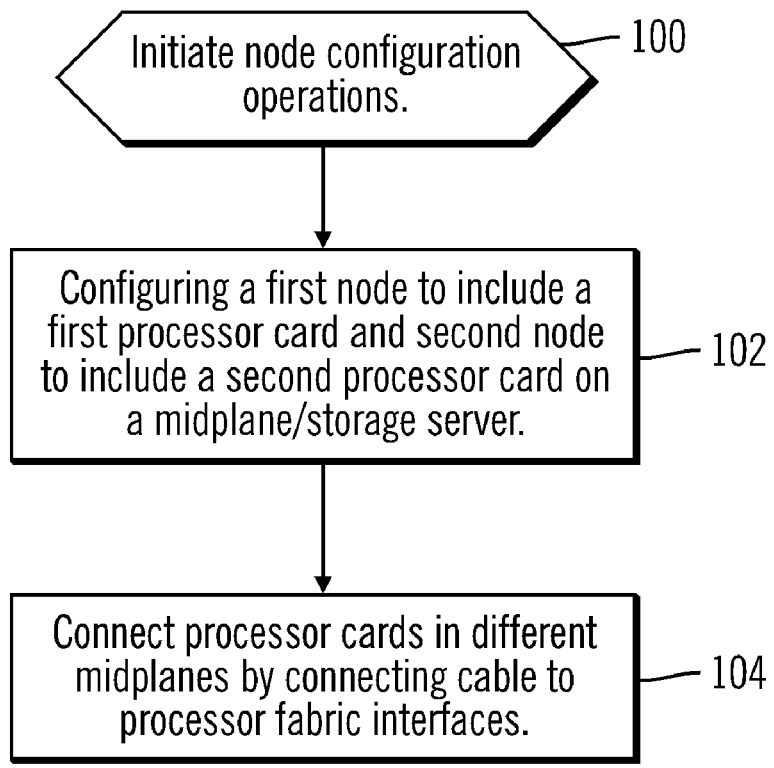
FIGS. 3 and 4 illustrate embodiments operations to configure processor cards in nodes.

FIG. 3 illustrates an embodiment of operations to configure nodes on a midplane 2a, 2b. Upon initiating configuration operations, (at block 100), a user may invoke (at block 102) code executed by the processor cards on one midplane/storage server to configure a first node to include a first processor card and second node to include a second processor card. The user may also connect (at block 104) processor cards in different midplanes using cables.

Figure 4:
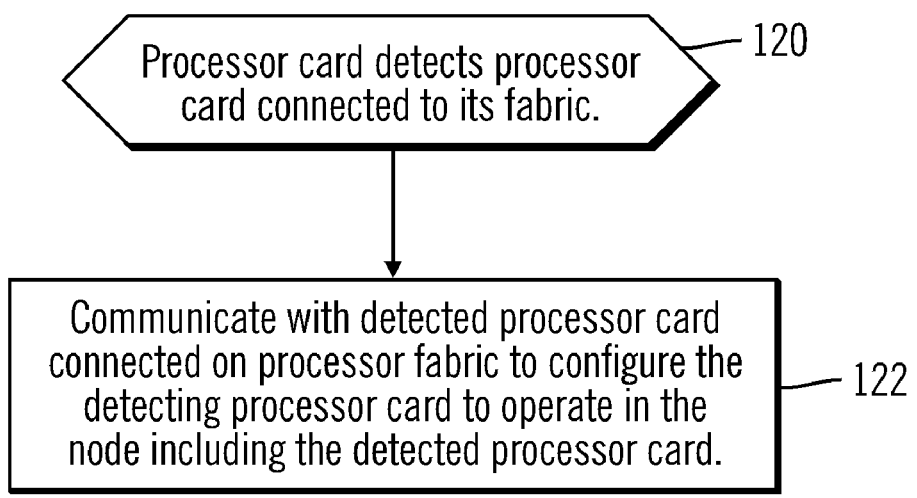

FIG. 4 illustrates operations performed by the processor cards to configure the processor card to operate in a node. Upon detecting (at block 120) a processor card 4a, 4b, 6a, 6b connected via the processor fabric 16a, 16b, 16c, 16d, the detected processor card communicates (at block 122) with the detecting processor card connected on processor fabric 16a, 16b, 16c, 16d to configure the detected processor card to operate in the node including the detecting processor card.

Figure 5:
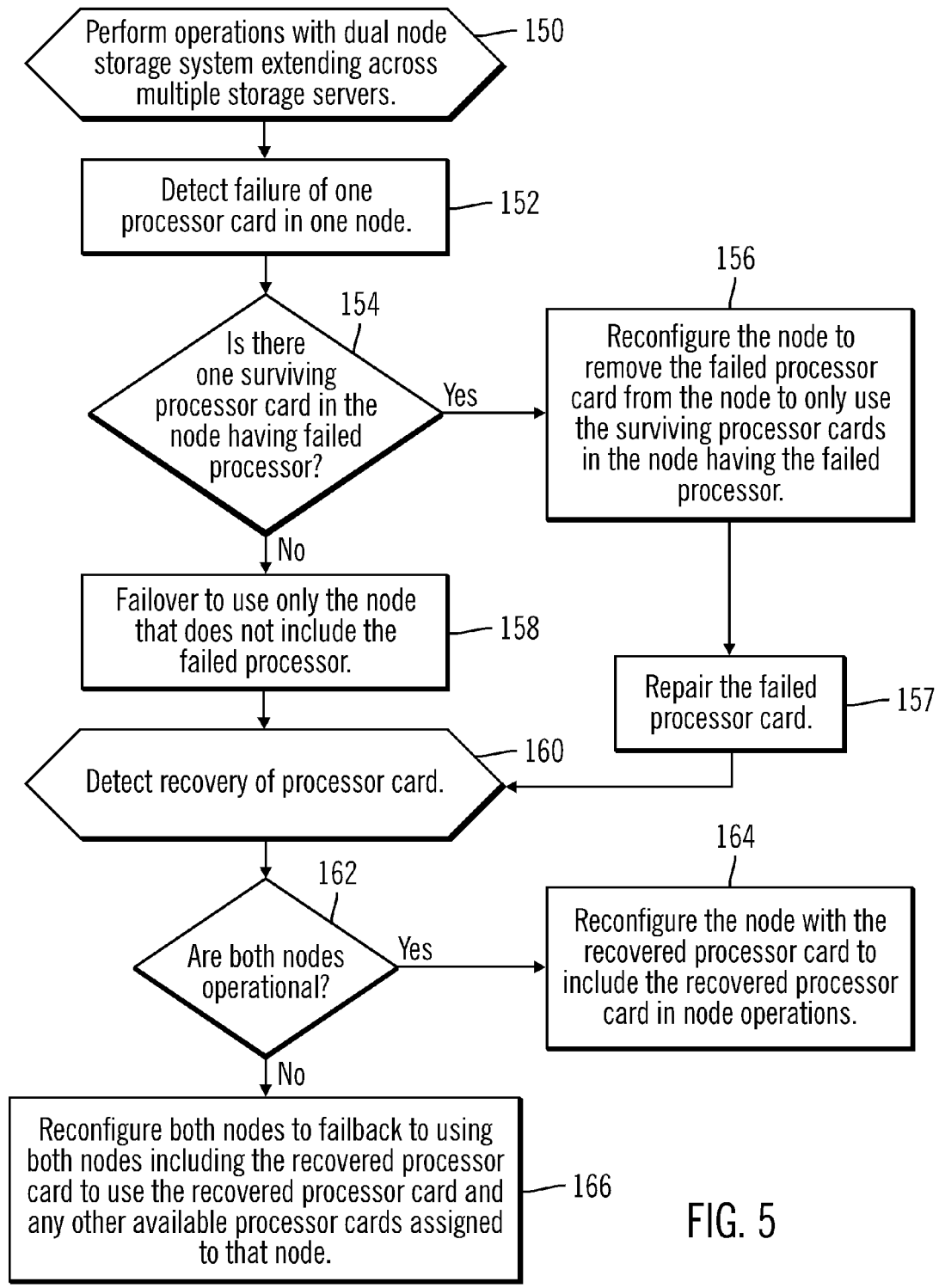
FIGS. 5 and 6 illustrate embodiments of operations to perform a failover and failback.

FIG. 5 illustrates an embodiment of operations to handle a failover and failback at one of the nodes. The operations may be performed by code implemented in a processor card of one or both of the nodes, either a processor card in the node in which one processor card failed and/or the processor card in another node being alerted of the failure via the inter-processor cluster bus 28a, 28b. While performing (at block 150) operations with a dual node storage system extending across multiple storage servers 50a, 50b, 50c (FIG. 2), a failure is detected (at block 152) of one processor card 58a, 58b, 58c, 60a, 60b, or 60c in one node. The failure may be detected and managed by an available processor card in the node in which the failure occurred and/or by a processor card in the other node. If (at block 154) there is one surviving processor card in the node having the failed processor, then the node with the failed processor card is reconfigured (at block 156) to remove the failed processor card from the node to only use the surviving processor cards in the node having the failed processor. The failed processor card may be repaired (at block 157). Otherwise, if (at block 154) there are no surviving processor cards in the node having the failed processor card, then failover is performed (at block 158) to use only the node that does not include the failed processor.

Upon detecting (at block 160) the recovery of the processor card that previously failed, if (at block 162) both nodes are operational, such as after the operation at block 156, then the node with the recovered processor card is reconfigured (at block 164) to include the recovered processor card in node operations. Otherwise, if (at block 162), only one node is operational, such as after the operation at block 108, then both nodes are reconfigured (at block 166) to failback to using both nodes including the recovered processor card to use the recovered processor card and any other available processor cards assigned to that node. Since I/O devices, 20a, 20b, 24a, 24b are connected to both node complexes, no I/O device is lost if one processor card 4a, 6a, 4b, 6b fails. Instead, only one connection through one node having the failed processor card is lost, not the connection through the node having the surviving processor cards.

Figure 6:
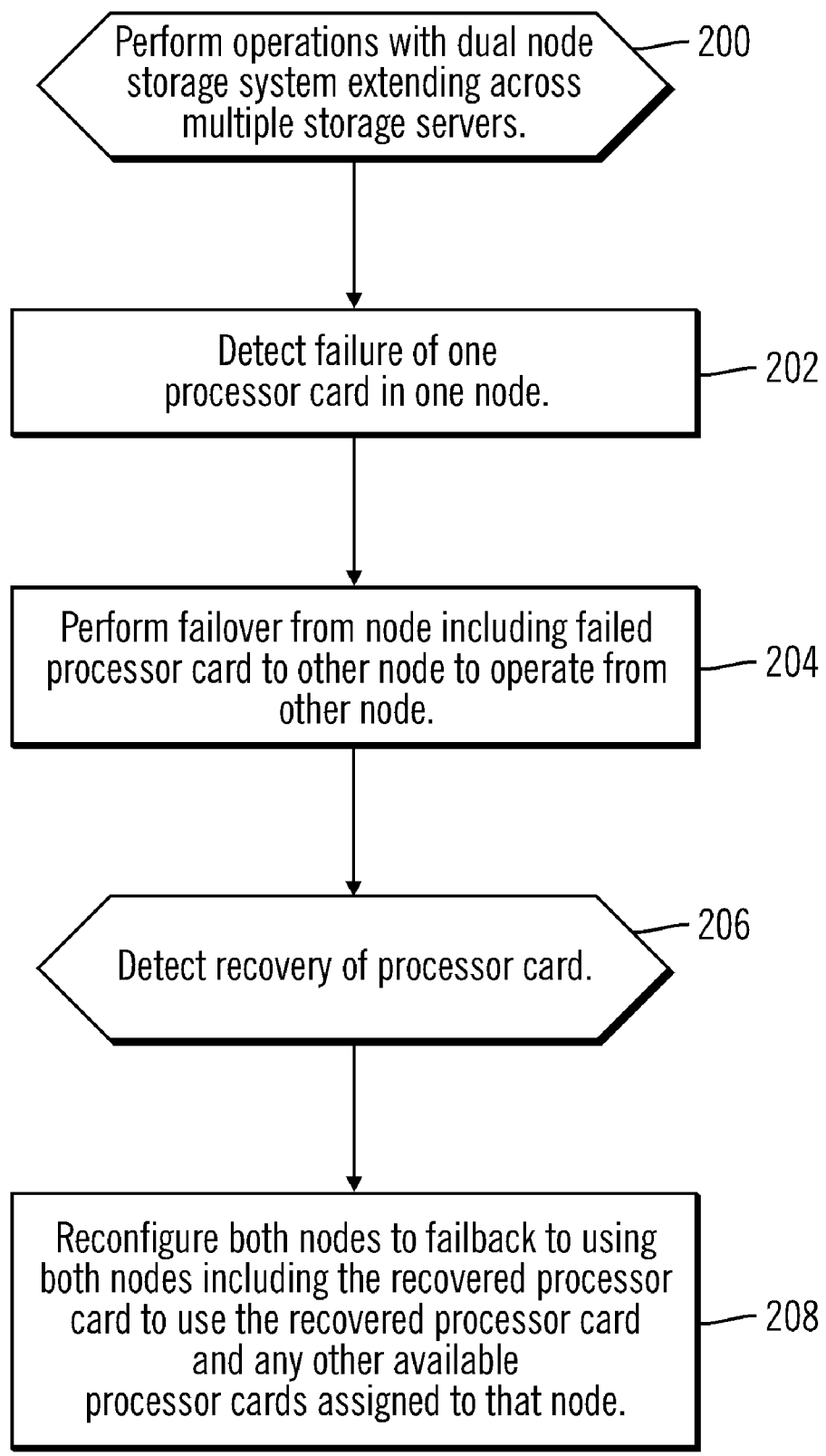

FIG. 6 illustrates an additional embodiment to handle a failover and failback at one of the nodes. The operations may be performed by code implemented in a processor card of one or more of the nodes, either a processor card in the node in which one processor card failed and/or the processor card in another node being alerted of the failure via the inter-processor cluster bus 28a, 28b. While performing (at block 200) operations with dual node storage systems extending across multiple storage servers 50a, 50b, 50c, failure of one processor card in one node is detected (at block 202). In response to the detected failure, failover is performed (at block 204) from the node including the failed processor card to the other node not including the failed processor to operate from other node. Thus, the failure of one processor card in the node causes the failover to another node even if the node with the failure has other operational processor cards.

Upon detecting (at block 206) the recovery of the processor card that previously failed, both nodes are reconfigured (at block 208) to failback to using both nodes including the recovered processor card to use the recovered processor card and any other available processor cards assigned to that node.

Described embodiments provide techniques to provide nodes that are implemented across processor cards on a same midplane or storage server, where the processor cards in a node connect via processor fabric interfaces on the processor cards. Described embodiments provide a technique to implement different nodes in a storage server across multiple storage server boxes to provide redundancy in order to allow failover and failback operations within and between the nodes.

Additional Embodiment Details

The described operations may be implemented as a method, apparatus or article of manufacture using standard programming and/or engineering techniques to produce software, firmware, hardware, or any combination thereof. The described operations may be implemented as code maintained in a "computer readable medium", where a processor may read and execute the code from the computer readable medium. A computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices. An "article of manufacture" comprises computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the present invention, and that the article of manufacture may comprise suitable information bearing medium known in the art.

The described embodiments of FIGS. 1 and 2 show two processor cards on each midplane 2a, 2b and storage server 50a, 50b, 50c, where each processor card on the same midplane connected to one or more processor cards on different midplanes/storage servers to form a node to handle I/O requests. In an alternative embodiment, there may be more than two processor cards on each midplane/storage server to allow the formation of more than two nodes, where each node includes a processor card from a different midplane/storage server. Further, in an additional embodiment, a node may include two processor cards on the same midplane/storage server. Yet further, instead of being directly coupled to midplanes 2a, 2b, the processor cards 4a, 4b, 6a, 6b may be implemented in separate boxes having I/O interfaces to mate with cables that connect the processor card boxes to one another or to the midplane.

In described embodiments, the nodes managed access to an I/O device, such as storage. In an alternative embodiment, the nodes may perform processing operations other than I/O operations, such as computational operations or managing access to an external device other than storage, such as printers, transmitters, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3, 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A system, comprising:
a first node comprising a plurality of processor cards each including a processor fabric, wherein the processor cards in the first node connect via their processor fabrics;
a second node comprising a plurality of processor cards each including a processor fabric, wherein the processor cards in the second node connect via their processor fabrics;
a plurality of communication interfaces, wherein each interface connects one processor card in the second node to one processor card in the first node to enable communication between the connected processor cards to coordinate processor operations between the connected processor cards in the first and second nodes; and
node management code executed by at least one processor card in each of the first and second nodes to perform operations, the operations comprising:
detecting a failure of one processor card in one of the first or second node;
determining whether the node including the failed processor card includes at least one operational processor card;
reconfiguring the first or second node including the failed processor card to operate without the failed processor card in response to the determining that the node includes at least one operational processor card; and
performing a failover to use the first or second node that does not include the failed processor card in response to the determining that the node does not include at least one operational processor card.

2. A system, comprising:
a first midplane including:
a first and second processor cards, wherein each processor card includes a processor fabric; and
a first communication interface connecting the first and second processor cards to enable communication between the first and second processor cards;
a second midplane including:
a third and fourth processor cards, wherein each processor card includes a processor fabric, wherein the first and third processor cards connect via their processor fabrics, and wherein the second and fourth processor cards connect via their processor fabrics; and
a second communication interface connecting the third and fourth processor cards to enable communication between the third and fourth processor cards; and
management code executed by at least one processor card to perform operations, the operations comprising:
detecting a failure of one processor card;
determining whether the failed processor card is connected via the processor fabrics to an operational processor card;
reconfiguring the failed and operational processor cards connected via their processor fabrics to operate without the failed processor card in response to the determining that the failed processor card is connected via the processor fabrics to the operational processor card; and
performing a failover to use processor cards connected via their processor fabrics that are not connected via processor fabrics to the failed processor card in response to the determining that the failed processor card is not connected via the processor fabrics to the operational processor card.

3. A method, comprising:
configuring a first node comprising a plurality of processor cards, each having a processor fabric, connected via their processor fabrics;
configuring a second node comprising a plurality of processor cards, each having a processor fabric, connected via their processor fabrics;
configuring a plurality of communication interfaces, wherein each interface connects one processor card in the second node to one processor card in the first node to enable communication between the connected processor cards to coordinate processor operations between the connected processor cards in the first and second nodes;
detecting a failure of one processor card in one of the first or second node;
determining whether the node including the failed processor card includes at least one operational processor card;
reconfiguring the first or second node including the failed processor card to operate without the failed processor card in response to the determining that the node includes at least one operational processor card; and
performing a failover to use the first or second node that does not include the failed processor card in response to the determining that the node does not include at least one operational processor card.

4. An article of manufacture comprising a computer readable storage including code executed in processor cards each having a processor fabric and coupled to one of a plurality of communication interfaces, wherein the code causes operations to be performed, the operations comprise:
configuring a first node comprising a plurality of the processor cards connected via their processor fabrics;
configuring a second node comprising a plurality of the processor cards connected via their processor fabrics;
configuring the communication interfaces, wherein each communication interface connects one processor card in the second node to one processor card in the first node to enable communication between the connected processor cards to coordinate processor operations between the connected processor cards in the first and second nodes;
detecting a failure of one processor card in one of the first or second node;
determining whether the node including the failed processor card includes at least one operational processor card;
reconfiguring the first or second node including the failed processor card to operate without the failed processor card in response to the determining that the node includes at least one operational processor card; and
performing a failover to use the first or second node that does not include the failed processor card in response to the determining that the node does not include at least one operational processor card.

* * * * *